US006434979B1

(12) United States Patent
Allen et al.

(10) Patent No.: US 6,434,979 B1
(45) Date of Patent: Aug. 20, 2002

(54) VEHICLE CLUTCH LOCKING DEVICE

(76) Inventors: Joseph Edward Allen, 9021 Shaun Cir., Anchorage, AK (US) 99502; Chad Anton Armstrong, P.O. Box 671463, Chugiak, AK (US) 99567

( * ) Notice: Subject to any disclaimer, the term of this patent is extended or adjusted under 35 U.S.C. 154(b) by 0 days.

(21) Appl. No.: 09/618,214

(22) Filed: Jul. 12, 2000

(51) Int. Cl.$^7$ .............................................. E05B 73/00
(52) U.S. Cl. ........................... 70/14; 70/58; 70/209; 70/237
(58) Field of Search ........................ 70/14, 18, 19, 70/57, 58, 209, 233, 237, 238, 258, 259

(56) References Cited

U.S. PATENT DOCUMENTS

| | | | |
|---|---|---|---|
| 3,703,024 A | 11/1972 | Johnson .................... 24/68 CD |
| 3,770,299 A | 11/1973 | Murphy ...................... 280/507 |
| 3,791,482 A | 2/1974 | Sykora ...................... 181/35 R |
| 3,797,178 A | 3/1974 | Mule ............................ 52/66 |
| 3,798,934 A | 3/1974 | Wright et al. ................... 70/59 |
| 3,815,388 A | 6/1974 | Nichol et al. .................. 70/63 |
| 3,837,545 A | 9/1974 | Rogers, Jr. .................... 224/31 |
| 3,868,837 A | 3/1975 | Quimby ....................... 70/259 |
| 3,877,639 A | 4/1975 | Wilson et al. ......... 237/12.3 C |
| 3,916,377 A | 10/1975 | Demeter ...................... 340/65 |
| 4,312,452 A | 1/1982 | Waier .......................... 211/23 |
| 4,426,861 A | * 1/1984 | Chillis .......................... 70/39 |
| 4,523,491 A | 6/1985 | Dittmannm, Jr. ............ 74/360 |
| 4,819,461 A | 4/1989 | Pearson ......................... 70/14 |
| 4,876,832 A | 10/1989 | Wasserman ................. 52/79.1 |
| 4,896,519 A | * 1/1990 | Pitts ............................. 70/58 |
| 4,989,323 A | 2/1991 | Casper et al. .............. 30/296.1 |
| 5,024,069 A | 6/1991 | Hull, Jr. et al. ................ 70/209 |
| 5,072,704 A | 12/1991 | Webb ...................... 123/179.1 |
| 5,138,853 A | 8/1992 | Chen .......................... 70/209 |
| 5,203,655 A | 4/1993 | Persau .......................... 410/3 |
| D339,973 S | 10/1993 | Chen ......................... D8/331 |
| 5,265,385 A | 11/1993 | Smith et al. .................. 52/79.5 |
| 5,265,449 A | 11/1993 | Rashleigh ...................... 70/18 |
| 5,295,556 A | 3/1994 | Mullin ....................... 182/187 |
| 5,315,848 A | 5/1994 | Beyer ............................ 70/18 |
| 5,421,611 A | 6/1995 | Peterson et al. .......... 280/763.1 |
| 5,507,121 A | 4/1996 | Taylor ............................ 52/66 |
| D369,738 S | 5/1996 | Hull, Jr. et al. ............... D8/331 |
| 5,557,956 A | 9/1996 | Merz ........................... 70/209 |
| 5,599,002 A | 2/1997 | Knutson ...................... 248/552 |
| 5,607,270 A | 3/1997 | Zimmerman ................... 410/3 |
| 5,630,318 A | 5/1997 | Folsom et al. ................ 60/492 |
| 5,638,705 A | 6/1997 | Buescher et al. .............. 70/14 |
| 5,655,369 A | 8/1997 | Folsom et al. ................ 60/414 |
| 5,655,370 A | 8/1997 | Folsom et al. ................ 60/491 |
| 5,657,629 A | 8/1997 | Folsom et al. ................ 60/491 |
| 5,724,839 A | 3/1998 | Thering ......................... 70/18 |
| 5,730,008 A | 3/1998 | Case et al. ..................... 70/18 |
| 5,802,887 A | 9/1998 | Béland .......................... 70/14 |
| 5,816,757 A | 10/1998 | Huston ......................... 410/3 |
| 5,829,945 A | 11/1998 | Stanley ....................... 414/477 |
| 5,839,889 A | 11/1998 | Folsom et al. ................ 418/31 |
| 5,864,223 A | 1/1999 | Meyer ......................... 370/137 |

* cited by examiner

Primary Examiner—Suzanne Dino Barrett
(74) Attorney, Agent, or Firm—Dorsey & Whitney LLP

(57) ABSTRACT

A clutch lock for preventing starting or operation of a recreational vehicle. The clutch lock includes a clutch member, a locking mechanism, and a handle. The clutch member includes two legs, connected at one end, to form a U-shape. The clutch member is placed through the housing on a vehicle's clutch. The locking mechanism operates to connect the two open ends of the legs of the clutch member to fix the clutch lock to the clutch housing. The lock is operable between a locked position where the clutch lock is fixed to the clutch housing and an open position where the locking mechanism may be removed to allow removal of the clutch lock. The handle extends away from the clutch member such that it makes contact with the frame of the vehicle to prevent the clutch from rotating and, thus, the vehicle from starting.

14 Claims, 5 Drawing Sheets

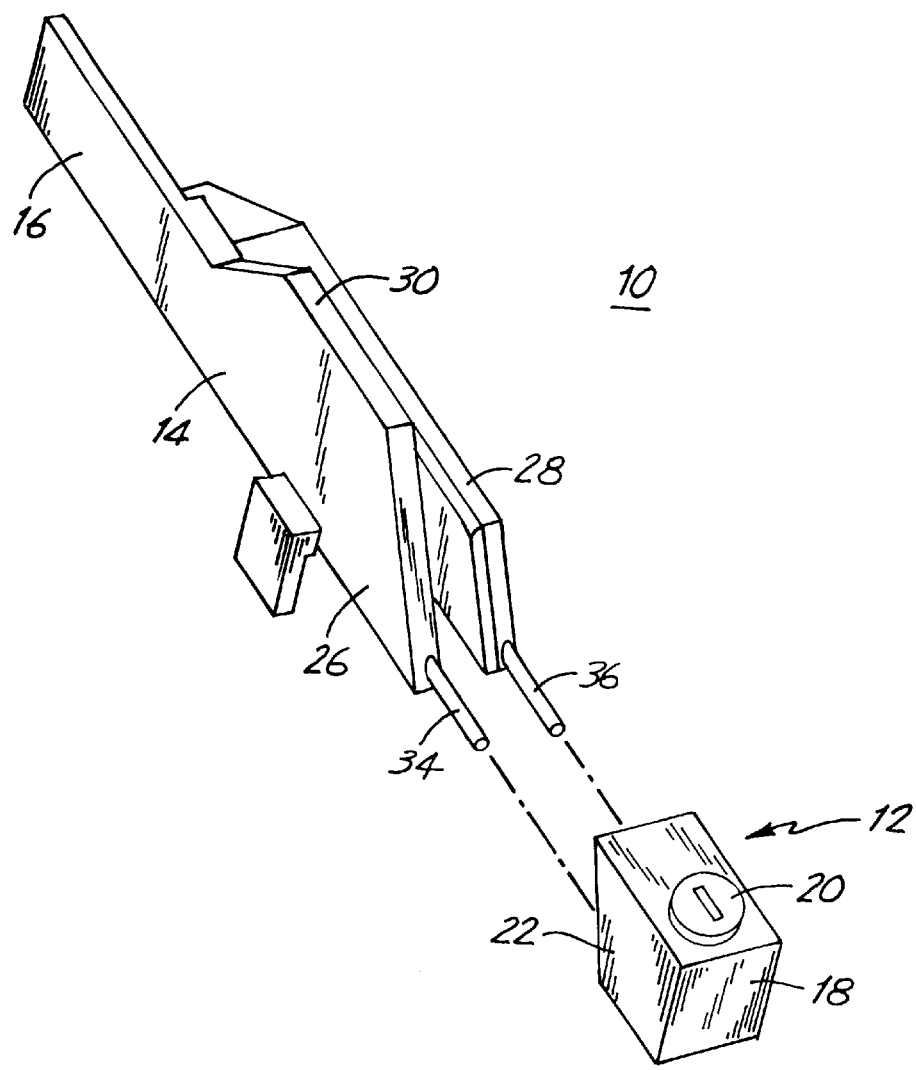
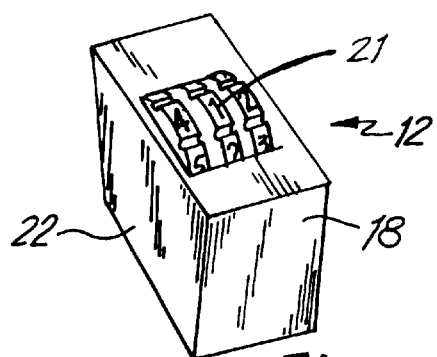
FIG. 2A
FIG. 2B

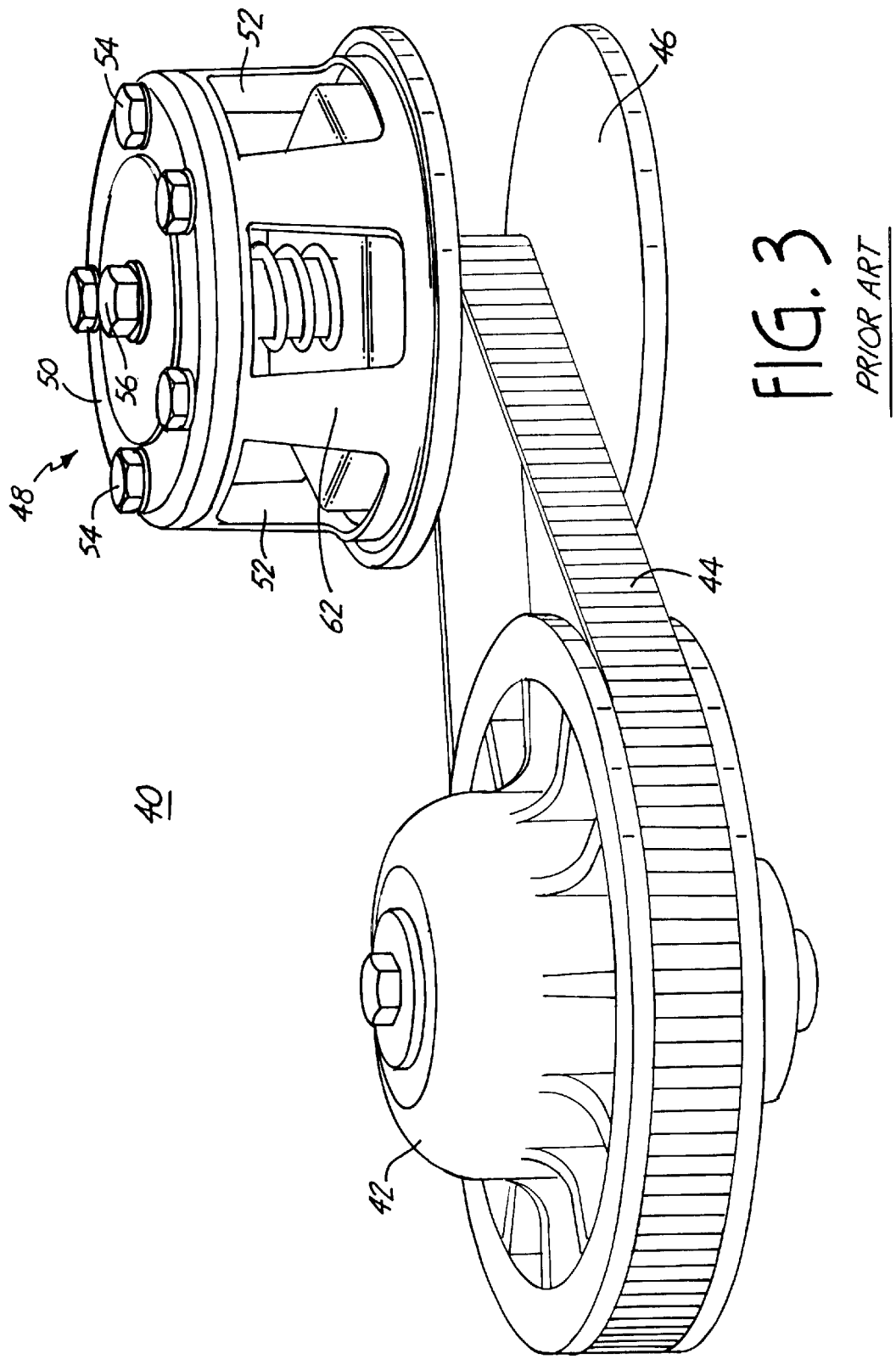
FIG. 3 _PRIOR ART_

VEHICLE CLUTCH LOCKING DEVICE

CROSS-REFERENCE TO RELATED APPLICATION(S)

None.

BACKGROUND OF THE INVENTION

The present invention relates to an anti-theft device for a recreational vehicle. More particularly, it relates to an anti-theft device designed for connection to the vehicle's clutch to prevent the engine from starting.

The use of recreational vehicles is on a steady upswing. Popular recreational vehicles include snowmobiles, all-terrain vehicles, motorcycles, and motor bikes. Recreational vehicles, in comparison to other motorized vehicles, are relatively small and lightweight. These features serve as one of the reasons for the popularity of recreational vehicles, but they also facilitate theft. The design of most recreational vehicles allows them to be easily started and operated by persons other than the owner. The majority of recreational vehicles in current use may be easily stolen because, while they have key-activated ignition systems, the key mechanism may be easily bypassed. This operation may be either an intentional attempt to steal the vehicle or may be an innocent mistake. In either case, there is a need for a device that functions to prevent operation of recreational vehicles by persons other than the owner.

A common type of anti-theft device for snowmobiles, known in the prior art, is a track lock. A typical track lock includes two members that extend along the internal surface and the external surface of the track of the snowmobile. A padlock is commonly used to connect the two open ends of the members, such that the device forms a loop around the snowmobile track. With a track lock in place, it is not possible to drive the machine from its current location. It is still possible, however, to start the engine of the snowmobile with the lock in place. This creates a potentially hazardous situation, as the operator may attempt to drive the snowmobile, which may result in damage to the track or damage to the snowmobile track drive mechanism. Also, the owner of the vehicle may forget that the track lock is in place and may attempt to operate the snowmobile without first removing the lock. Again, this may result in damage to the snowmobile or injury to the owner. The track is also limited in that it can only be used on recreational vehicles having a track.

Another type of anti-theft device known in the prior art is a throttle lock. A throttle lock prevents the recreational vehicle operator from actuating the throttle lever to cause acceleration of the vehicle. Like the track lock, however, the throttle lock does not prevent starting of the recreational vehicle. The throttle lock, therefore, is of limited value as a skilled operator can access the vehicle's engine compartment and actuate the throttle by pulling directly on the throttle wire. This is especially problematic with snowmobiles, as the engine compartment is generally readily accessible.

There is a need in the art for a locking device for use on recreational vehicles that prevents an unauthorized operator from starting the engine, thereby reducing the likelihood that the vehicle will be stolen, while not causing damage due to attempts to start the vehicle with the lock in place.

BRIEF SUMMARY OF THE INVENTION

The present invention provides a clutch lock for a recreational vehicle, such as a snowmobile, having a clutch including a clutch housing and a frame, and encompasses a method of locking vehicles, such as snowmobiles, with clutches. In one embodiment, the clutch lock includes a clutch member, a locking mechanism, and a handle. The clutch member has two legs connected at one end and is configured for attachment to the clutch housing. The locking mechanism is configured for coupling with the open ends of the legs of the clutch member. The locking mechanism is operable between a locked position where it is fixed to the open ends and an open position where it is moveable from the open ends. The handle is coupled to the clutch member and is of a length sufficient to contact the frame upon rotation of the clutch housing, during an attempt to start the engine, to prevent further rotation of the clutch housing, thereby preventing the engine from starting.

BRIEF DESCRIPTION OF THE DRAWINGS

FIG. 2A is an exploded perspective view of the clutch locking device of the present invention, and FIG. 2B is a perspective view of a lock portion having a combination lock.

FIG. 3 is a perspective view of a typical snowmobile starter and clutch assembly.

DETAILED DESCRIPTION

Figure 1:
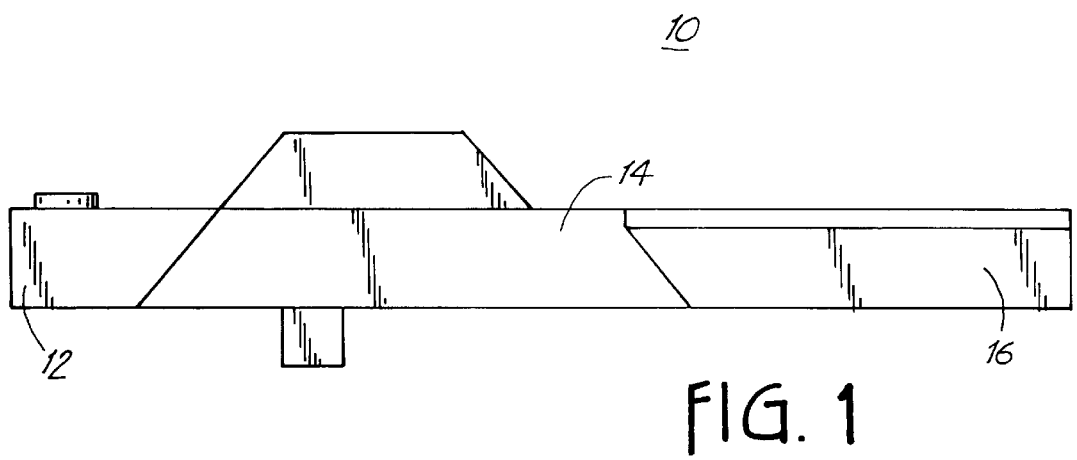
FIG. 1 is a side view of a vehicle clutch locking device according to the present invention.

FIG. 1 shows a front view of a vehicle clutch lock 10 according to the present invention. The vehicle clutch lock 10 includes, as shown from left to right in FIG. 1, a lock portion 12, a bracket 14, and a handle 16. The bracket 14 is configured to mount securely around components of the clutch located in a typical recreational vehicle. The lock portion 12 is releasably coupled to the bracket 14 and prevents removal of the vehicle clutch lock 10. The handle 16 is coupled to the end of the bracket 14 located opposite the lock portion 12 and serves at least two functions. First, the handle 16 aids in mounting of the vehicle clutch lock 10 to the clutch. Second, the handle 16 is the component of the vehicle clutch lock 10 that prevents the clutch from rotating when the vehicle clutch lock 10 is in place. The handle 16 is a generally rigid and elongated member.

FIG. 2A shows an exploded perspective view of the vehicle clutch lock 10 according to the present invention. The vehicle clutch lock 10 is shown in FIG. 2A in the open position with the lock portion 12 removed from the bracket 14. As shown in FIG. 2A, the lock portion 12 includes a lock body 18 and a locking mechanism 20. The lock body 18 is configured to hold the locking mechanism 20 and is appropriately sized to mate with the bracket 14. The lock body 18 includes, as shown on the right in FIG. 2A, a mounting face 22. As shown in FIG. 2A, the mounting face 22 is cut at an angle to couple properly with the bracket 14, which is all at generally the same angle. In another embodiment, the mounting face 22 and the bracket 14 are cut at an angle perpendicular to a longitudinal centerline. In other embodiments, the mounting face 22 and the bracket 14 may be cut at different angles as appropriate. The lock body 18 also includes two bores (not shown) into the mounting face 22. In one embodiment, the lock mechanism 20 is a key operated lock. In another embodiment, as shown in FIG. 2B, the lock mechanism 21 is a combination operated lock. Any other type of lock mechanism known in the art may also be used as the lock mechanism of the present invention.

As further shown in FIG. 2A, the bracket 14 of the vehicle clutch lock 10 includes a first prong 26 and a second prong 28. The first prong 26 and the second prong 28 are coupled at the end of the bracket 14 generally adjacent to where the handle 16 attaches. Thus, the bracket 14 is generally U-shaped. As shown in FIG. 2A, the bracket 14 is open on the end facing away from the handle 16 toward the lock portion 12. As further illustrated, the first prong 26 includes a clutch bolt shield 30 and a crank bolt shield 32. The clutch bolt shield 30 extends upward from the first prong 26 and functions to cover bolts on the clutch housing to prevent removal of the vehicle clutch lock 10 by disassembly of the clutch, as discussed in greater detail below. The crank bolt shield 32 extends downward from the first prong 26 and covers the head of the cam bolt running through the center of the clutch body. The crank bolt shield 32 prevents a person from removing the clutch by removing the entire clutch body from the recreational vehicle. As further shown in FIG. 2A, the first prong 26 includes a first latch 34, and the second prong 28 includes a second latch 36. The latches 34 and 36 are sized for insertion into the bores in the lock body 18, and they are designed to be fixed in the lock body 18 upon actuation of the locking mechanism 20 into the locked position. In an alternative embodiment, only one of the first prong 26 and second prong 28 have a latch for connection to the lock body 18.

A typical snowmobile clutch mechanism 40 is illustrated in FIG. 3. As shown in FIG. 3, the clutch mechanism 40 includes a starter pulley 42, a drive belt 44, a clutch pulley 46, and a spring-loaded clutch mechanism 48. As further shown in FIG. 3, the spring-loaded clutch mechanism 48 includes a face plate 50 and mounting posts 52. The face plate 50 is attached to the mounting posts 52 by bolts 54. Crank bolt 56 couples the spring-loaded clutch housing 48 to the crankshaft of the snowmobile's engine. The snowmobile clutch mechanism 40 of FIG. 3 will be for the remainder of the description of the invention. It is important to note, however, that the vehicle clutch lock 10 can likewise be applied to clutch mechanisms of other types of recreational vehicles (e.g., all-terrain vehicle, motorcycles, motorbikes, and scooters).

Figure 4:
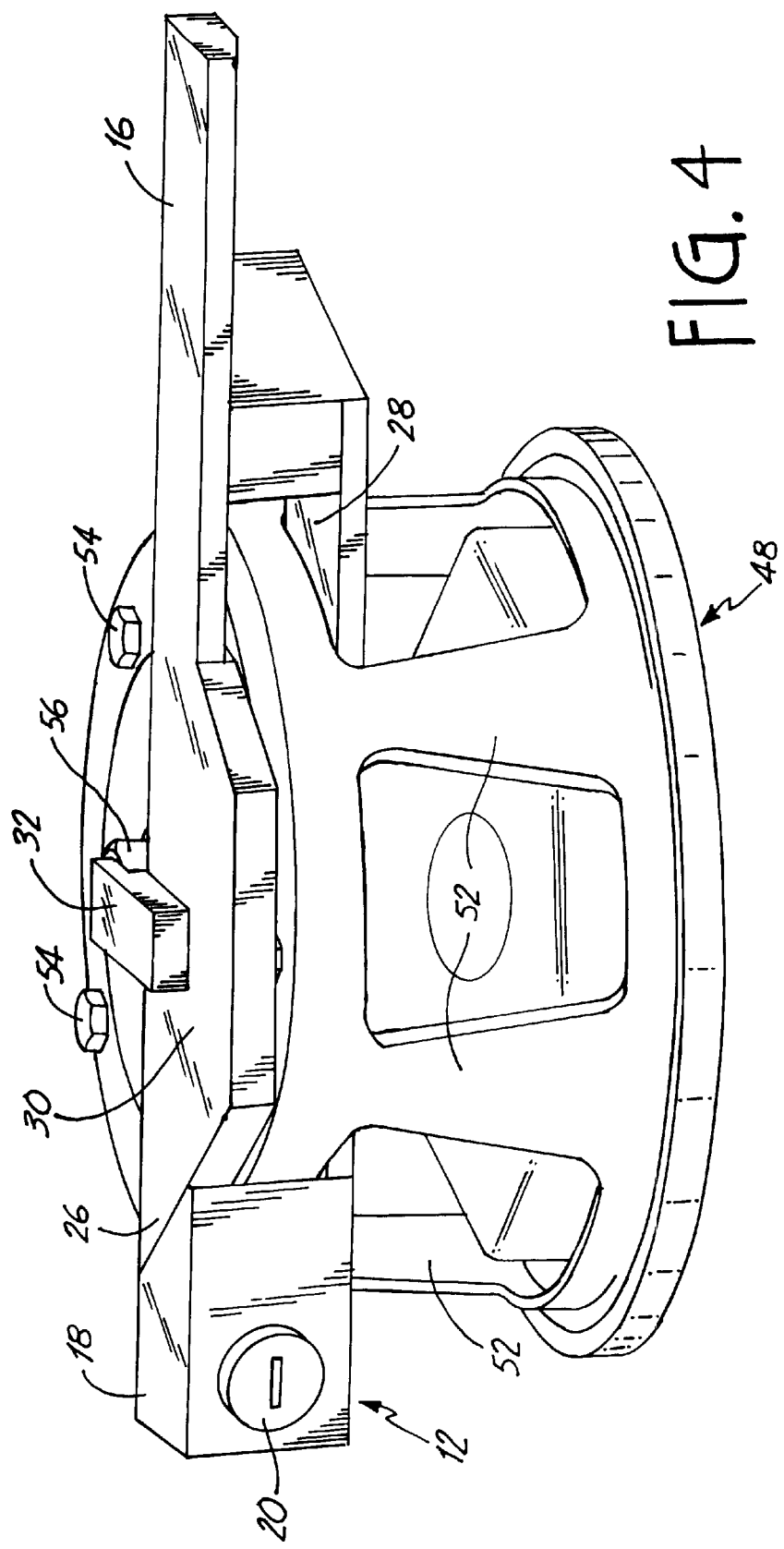
FIG. 4 is a perspective view of a snowmobile clutch assembly with the clutch locking device of the present invention in place.

FIG. 4 shows the vehicle clutch lock 10 in place on the snowmobile's spring-loaded clutch housing 48. As shown in FIG. 4, when the vehicle clutch lock 10 is in its operating position, the first prong 26 is disposed along an outer surface of the face plate 50. The second prong 28 is disposed along an inner surface of the face plate 50 and couples to the first prong 26 by extending between an opening 56 located between two of the mounting prongs 52. As further shown in FIG. 4, the locking portion 12 couples the open ends of the first prong 26 and the second prong 28 to fix the vehicle clutch lock 10 to the spring-loaded clutch mechanism 48.

As can be seen in FIG. 4, the first prong 26 and the second prong 28 surround two mounting arms 52. The clutch bolt shield 30 extends from the first prong 26 toward and outer edge of the face plate 50, such that it extends over the top of two of the bolts 54 used to mount the face plate 50 to the mounting arms 52. By covering the heads of the bolts 54, the clutch bolt shield 30 prevents a person from removing the vehicle clutch lock 10 from the spring-loaded clutch housing 48 by disassembling the clutch housing 48. The crank bolt shield 32 extends from the first prong 26 toward to a center of the face plate 50. The crank bolt shield 32 covers the crank mounting bolt 56 and prevents a person from loosening or removing the crank mounting bolt 56 and thereby removing the spring-loaded clutch housing 48 to allow starting of the snowmobile. The handle 16 extends from the bracket 14 of the vehicle clutch lock 10 in a direction away from the lock portion 12. The handle 16 acts to prevent the spring-loaded clutch housing 48 from rotating, as explained in greater detail below, thereby prohibiting the snowmobile from starting. In an alternative embodiment, the handle 16 is coupled to the lock portion 12.

A further advantage of the design of the present invention is illustrated in FIG. 4. As shown, the lock portion 12 mounts to the first prong 26 and the second prong 28 along an angled surface. This angle acts to obstruct removal of the vehicle clutch lock 10 by cutting through the latches 34 and 36, such as with a hacksaw. The angled surface also better matches that of the clutch housing 48 providing for a more secure fit of the vehicle clutch lock 10. The vehicle clutch lock 10 is designed to fit snugly to the spring-loaded clutch housing 48 to prevent minimal sliding or rocking of the rear wheel clutch lock 10 when someone attempts to start the snowmobile. This tight fit will convey, to an unauthorized person attempting to start the snowmobile, the impression that the snowmobile engine has seized or locked up, as further discussed below. It is important to note that the particular dimensions of the components of the vehicle clutch lock 10 described can be easily adjusted by one of ordinary skill in the art, so that the vehicle clutch lock 10 fits the particular clutch present in a particular recreational vehicle.

Figure 5:
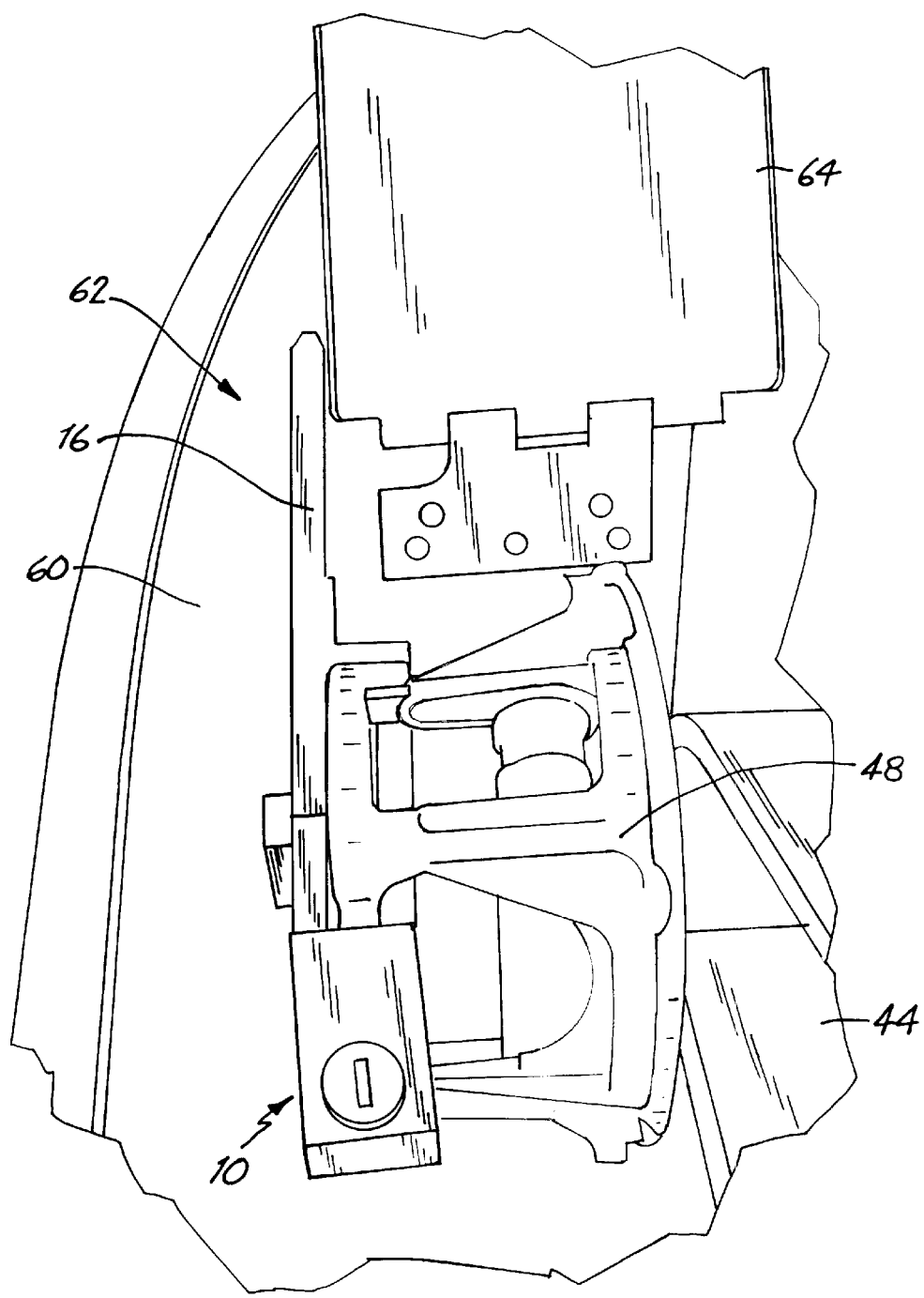
FIG. 5 is a perspective view of the clutch locking device of the present invention in place in a snowmobile.

FIG. 5 shows a perspective view of the engine compartment 60 of a typical snowmobile with the vehicle clutch lock 10 mounted to the spring-loaded clutch housing 48. As shown in FIG. 5, the engine compartment 60 includes a frame 62 and a clutch shield 64. As illustrated in FIG. 5 when the vehicle clutch lock 10 is in its intended operating position, attached to the spring-loaded clutch housing 48, the handle 16 extends toward a front end of the engine compartment 60 of the snowmobile, such that it contacts the frame 62. This contact between the handle 16 and the frame 62 of the engine compartment 60 prevents rotation of the clutch mechanism 40 and, thereby, prevents starting of the snowmobile's engine. As shown in FIG. 5, the snowmobile clutch lock, during operation, is located inside the engine compartment 60 and thus hidden from an unauthorized user of the snowmobile. Because the vehicle clutch lock 10 is out of plain view, when an unauthorized person attempts to start the snowmobile by pulling on the rope, the person will think that the snowmobile engine has seized or locked up and will most likely move on to the next potential target.

To install the vehicle clutch lock 10 on a snowmobile, the owner opens the engine compartment 60 and lifts the clutch shield 64 to expose the spring-loaded clutch housing 48. The owner next operates the locking mechanism 20 to release lock portion 12 from the bracket 14 and the handle 16. The owner then holds the vehicle clutch lock 10 by the handle 16 and inserts the two prongs 26 and 28 around the face plate 50 of the spring-loaded clutch housing 48. The lock portion 12 is then coupled to the bracket 14 by inserting the latches 34 and 36 into the bores of the lock body 18. The lock portion 12 is fixed to the bracket 14 by turning the locking mechanism 20 to the lock position and removing the key. The operator then replaces the clutch shield 64 and closes the engine compartment 60. This quick and easy connection of the vehicle clutch lock 10 to the clutch housing 48 is one of the many advantages of the present invention.

In one embodiment, the present invention further includes a mount (not shown) for holding the vehicle clutch lock 10 when not in use. The mount may be located at any convenient position on the recreational vehicle for holding the vehicle clutch lock 10. In one embodiment, the mount 66 is located inside the engine compartment 60 where possible. In one embodiment, the mount 66 is coupled to the clutch shield 64 (shown in FIG. 5). In another embodiment, the mount 66 is connected directly to the vehicle frame. The size and shape of the mount are adapted to allow the vehicle clutch lock 10 to couple securely to the mount. The mount provides a safe and secure location for the vehicle clutch lock 10, when it is not being used on the recreational vehicle.

Although the present invention has been described with reference to preferred embodiments, workers skilled in the art will recognize that changes may be made in form and detail without departing from the spirit and scope of the invention. Any references to front and back, right and left, top and bottom, upper and lower, and horizontal and vertical are intended for convenience of description, not to limit the present invention or its components to any one positional or spacial orientation. All dimensions of the components in the attached figures may vary with a potential design and the intended use of an embodiment of the invention without departing from the scope of the invention. Also, components of the present invention may be connected, joined, or attached by appropriate fasteners and fastening methods such as welding, adhesives, nut and bolt arrangements, screws, pins, rivets, and the like, as well as other conventional fastening devices and methods.

We claim:

1. A clutch lock for a vehicle having a clutch housing and a frame, the clutch lock comprising:

a clutch member configured for attachment to the clutch housing, the clutch member having a first leg and a second leg, each leg having first and second ends, the first and second legs coupled at the first ends and open at the second ends;

a locking mechanism configured for integrally coupling with the second ends of the clutch member, the locking mechanism operable between a locked position where the locking mechanism is fixed to the second ends and an open position where the locking mechanism is removable from the second ends; and a handle coupled to the clutch member and having a length sufficient to contact the frame of the vehicle upon rotation of the clutch housing, such that further rotation of the clutch housing is prevented;

wherein the first leg of the clutch member is configured to extend along a face plate coupled to the clutch housing by a plurality of fasteners and includes a first shield extending from the first leg to near an outer periphery of the face plate, such that the first shield covers at least one of the fasteners coupling the face plate to the clutch housing.

2. The clutch lock of claim 1 wherein the first leg includes a second shield extending from the first leg to near a center of the face plate, such that the second shield covers a bolt securing the clutch housing to a crankshaft of the vehicle.

3. The clutch lock of claim 1 wherein the locking mechanism is operated between the locked position and the open position by a key.

4. The clutch lock of claim 1 wherein the locking mechanism is operated between the locked position and the open position by a combination lock.

5. The clutch lock of claim 1 wherein the handle is coupled to the locking mechanism and has a length sufficient to contact the frame of the vehicle upon rotation of the clutch housing, such that further rotation of the clutch housing is prevented.

6. A clutch lock for a vehicle having a clutch housing and a frame, the clutch lock comprising:

a clutch member configured for attachment to the clutch housing, the clutch member having a first leg and a second leg, each leg having first and second ends, the first and second legs coupled at the first ends and open at the second ends;

a locking mechanism configured for integrally coupling with the second ends of the clutch member, the locking mechanism operable between a locked position where the locking mechanism is fixed to the second ends and an open position where the locking mechanism is removable from the second ends; and a handle coupled to the clutch member and having a length sufficient to contact the frame of the vehicle upon rotation of the clutch housing, such that further rotation of the clutch housing is prevented;

wherein the coupling surface between the clutch member and the locking mechanism extends at an angle of less than ninety degrees from a longitudinal axis of the clutch member.

7. The clutch lock of claim 6 wherein the locking mechanism includes two bores configured for mating with the second ends of the first and second legs of the clutch member and for fixing the second ends inside of the locking mechanism when in the locked position.

8. The clutch lock of claim 6 wherein the first leg includes a first shield extending from the first leg to near a center of the face plate, such that the second shield covers a bolt securing the clutch housing to a crankshaft of the vehicle.

9. The clutch lock of claim 6 wherein the first leg includes a first shield extending from the first leg to near an outer periphery of the face plate, such that the first shield covers at least one of the fasteners coupling the face plate to the clutch housing.

10. A lock for snowmobiles having a cylindrical clutch housing mounted on a frame, the lock comprising;
   a bracket configured for releasably coupling to the cylindrical clutch housing, the bracket having a first prong and a second prong connected at a first end and open at a second end;
   a handle connected to the first end of the bracket, the handle having a length sufficient to contact the frame upon rotation of the cylindrical housing; and
   a lock body having a bore therein, the lock body including a locking mechanism;
   a shield coupled to the first prong of the bracket, the shield extending downward from the bracket in a direction perpendicular to the longitudinal center line, the shield adapted for obstructing or covering a mounting bolt on the cylindrical clutch housing;
   wherein one of the prongs of the bracket has a latch on the second end for insertion into the bore of the lock body, and the lock mechanism may be operated to fix the latch in the bore of the lock body.

11. The lock of claim 10 further comprising a second latch connected to the second prong of the bracket, and wherein the lock body has a second bore therein for receiving the second latch, and the lock mechanism is configured to fix the second latch and the lock body.

12. The lock of claim 10 wherein the second end of the first and second prong of the bracket are cut at an angle, and further wherein a first end of the lock body is cut at an opposite angle such that when the lock body is coupled with the bracket, the point of contact between the lock body and the bracket extends at an angle of less than ninety degrees with respect to a longitudinal axis of the bracket.

13. The lock of claim 10 wherein the lock mechanism of the lock body is a key-actuated lock.

14. The lock of claim 10 wherein the lock mechanism of the lock body is a combination-type lock.

* * * * *